(12) United States Patent
Yin

(10) Patent No.: US 6,489,949 B1
(45) Date of Patent: Dec. 3, 2002

(54) MULTI-FUNCTIONAL KEYBOARD

(75) Inventor: Chun-Shiung Yin, Yung-Kang (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/542,887

(22) Filed: Apr. 4, 2000

(30) Foreign Application Priority Data

May 26, 1999 (TW) ...................................... 88208503 U

(51) Int. Cl.[7] .............. G06F 1/16; H05K 5/03
(52) U.S. Cl. .............. 345/168; 361/680; 361/681
(58) Field of Search .................. 345/168; 361/681, 361/680

(56) References Cited

U.S. PATENT DOCUMENTS

| | | | | |
|---|---|---|---|---|
| 5,494,447 A | * | 2/1996 | Zaidan | 439/31 |
| 5,644,469 A | * | 7/1997 | Shioya et al. | 361/681 |
| 5,661,641 A | * | 8/1997 | Shindo | 361/814 |
| 6,262,716 B1 | * | 7/2001 | Raasch | 345/168 |

* cited by examiner

*Primary Examiner*—Steven Saras
*Assistant Examiner*—William C. Spencer
(74) *Attorney, Agent, or Firm*—Ladas & Parry

(57) ABSTRACT

A keyboard includes a keyboard body and a cover. On the keyboard body are provided grooves. The cover has pivots movably mounted in the grooves so that the cover is rotatable and movable with respect to the keyboard body. Alternatively, slots are provided on the cover. The keyboard body has pivots movably mounted in the slots so that the cover is rotatable and movable with respect to the keyboard body.

18 Claims, 11 Drawing Sheets

MULTI-FUNCTIONAL KEYBOARD

BACKGROUND OF THE INVENTION

1. Field of the Invention

The present invention relates in general to a multi-functional keyboard which occupies only a very small amount of extra space.

2. Description of the Related Art

A keyboard is one of the most important input devices of a computer and is frequently used by the user. The manufacturers have been developing a variety of keyboards equipped with devices in order to enhance the operating convenience for the users. For example, a device is provided to protect the keyboard from dust or function as a wrist rest. Related documents include U.S. Pat. Nos. 5,193,925, 5,346,164, 5,522,572, 5,596,481, 5,835,342. However, all of the devices of the prior art are structurally independent from the keyboards. In design, they are large and occupy space.

SUMMARY OF THE INVENTION

An object of the present invention is to provide a multi-functional keyboard which occupies only a very small amount of extra space.

The keyboard of the present invention includes a keyboard body and a cover. On the keyboard body are provided grooves. The cover has pivots movably mounted in the grooves so that the cover is rotatable and movable with respect to the keyboard body.

Alternatively, slots are provided on the cover. The keyboard body has pivots movably mounted in the slots so that the cover is rotatable and movable with respect to the keyboard body.

In the present invention, the cover is movably pivoted onto the keyboard body. By this arrangement, the cover occupies only a very small amount of extra space, which is an asset of the present invention.

In addition to the dust protection and wrist-rest provided by the prior art, the present invention provides the function of document support. The user can type on the keyboard of the present invention while reading. That is another asset of the keyboard of the present invention.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1A:
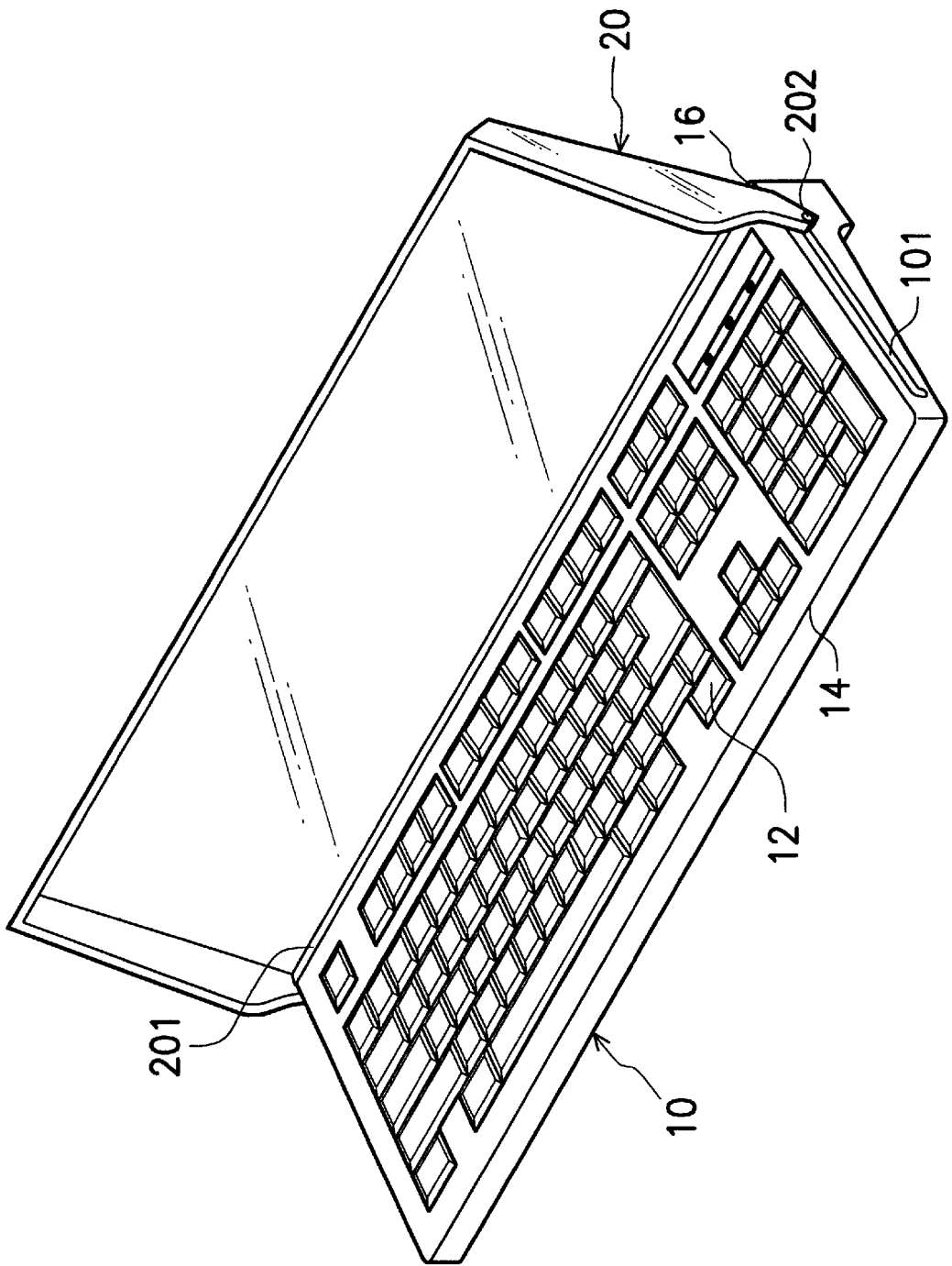
FIG. 1A is a perspective diagram of a keyboard in accordance with a first embodiment of the present invention.
Figure 1B:
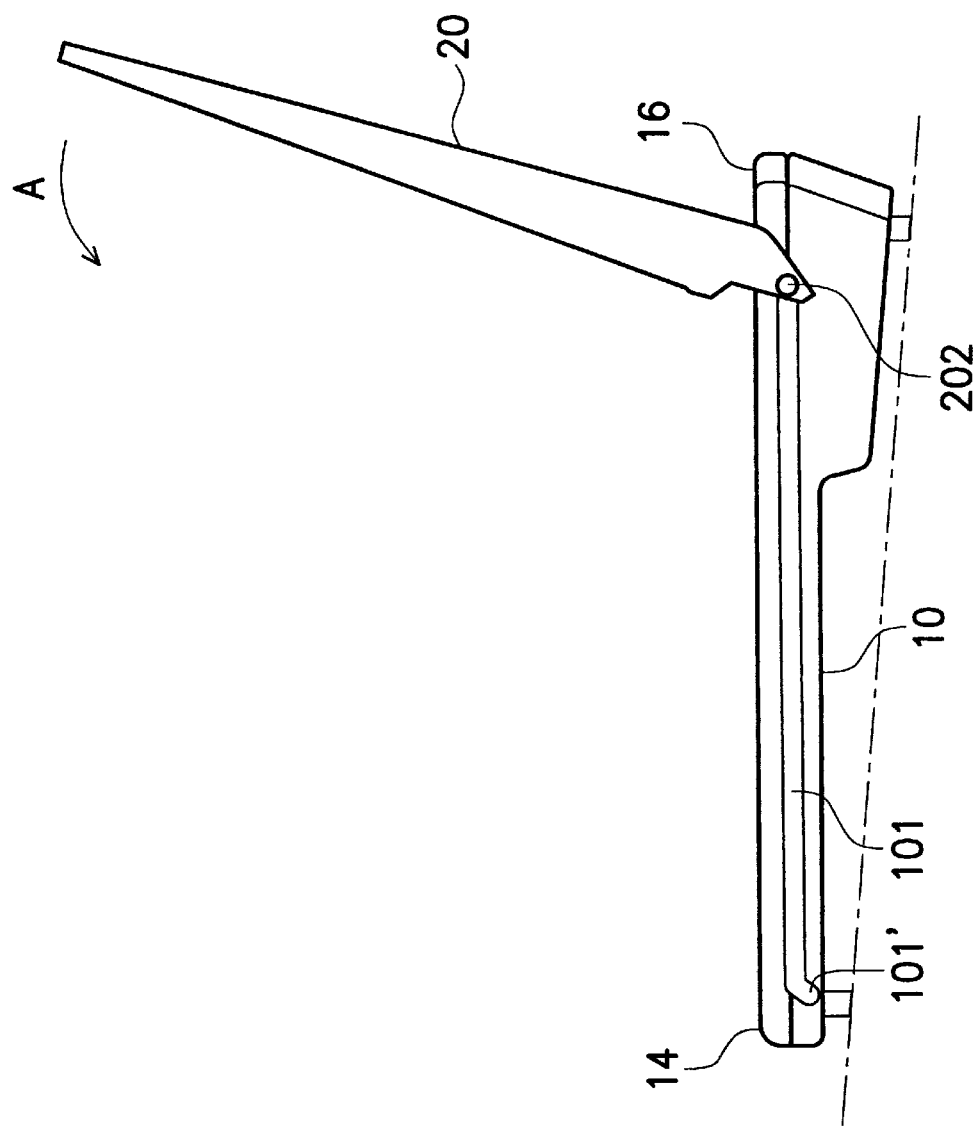
FIG. 1B is a side view of FIG. 1A.

Referring to FIGS. 1A and 1B, a keyboard of a first embodiment of the present invention includes a keyboard body 10 and a cover 20. The keyboard body 10 is substantially rectangular and has a front edge 14, a back edge 16 and a plurality of keys 12 on its top surface. On two opposite sides of the keyboard body 10 are provided grooves 101. Each groove 101 extend in a direction from the back edge 16 to the front edge 14. The extending direction of the groove 101 is changed near the front edge 14 of the keyboard body 10 where an operating zone 101' is formed at the end of the groove 101. The cover 20 is substantially rectangle and therefore has four corners. On two adjacent corners are provided pivots 202. The pivots 202 are movably mounted in the grooves 101 so that the cover 20 is rotatable and movable with respect to the keyboard body 10. The cover 20 further has a flange 201 at its edge to support documents (not shown).

In addition to functioning as an input device of a computer, the keyboard of the present invention provides many auxiliary functions for the user. For example, as shown in FIGS. 1A and 1B, the cover 20 stands up based on the pivots 202 at a first position near the back edge 16 to support documents. The bottom of the documents rests on the flange 201 of the cover 20 or the top surface of the keyboard body 10 so that the user can read the documents while typing.

When the keyboard is not in use, the user rotates the cover 20 with respect to the pivot 202 in a direction "A" in FIG. 1B to cover the keyboard body 10 so as to protect the keyboard body 10 from dust. The result is shown in FIG. 2, wherein the pivot 202 is at a second position between the front edge 14 and the back edge 16 of the keyboard body 10.

Figure 2:
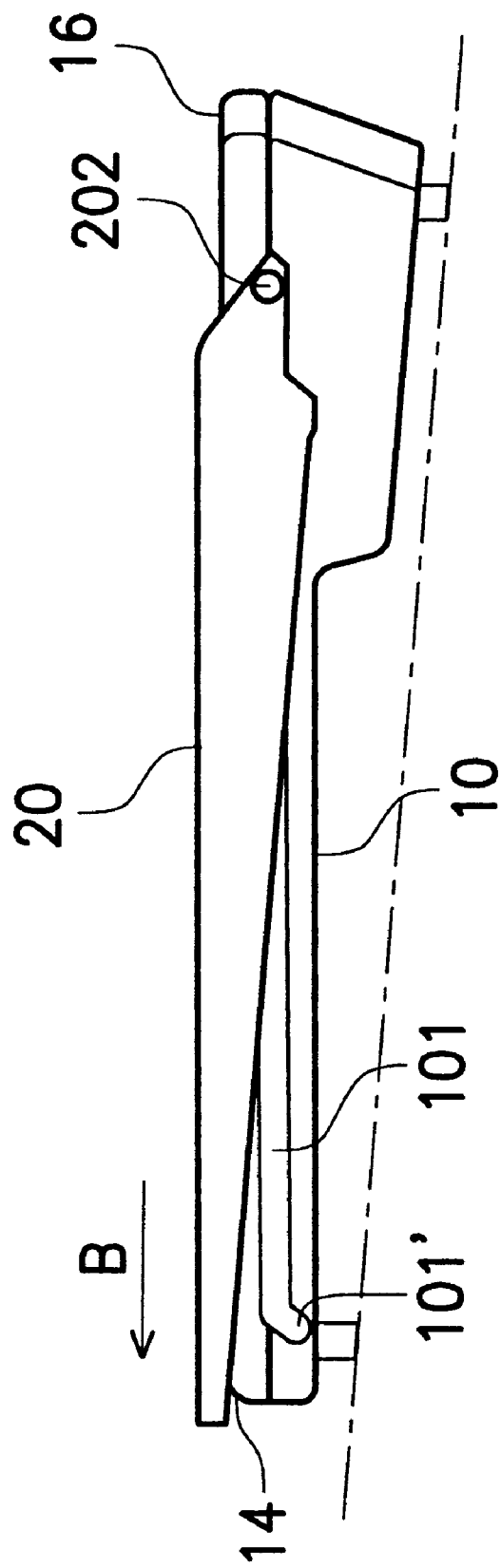
FIG. 2 shows a cover of the keyboard in a dust-protection operation in accordance with the first embodiment of the present invention.
Figure 3:
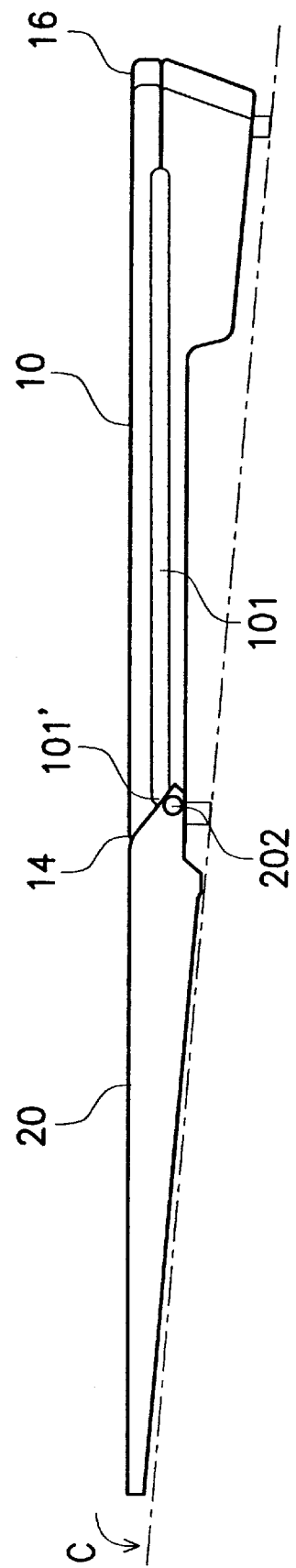
FIG. 3 shows the transition of the keyboard from FIG. 2 to FIG. 4, which also serves as a wrist-rest operation of the cover in accordance with the first embodiment of the present invention.
Figure 4:
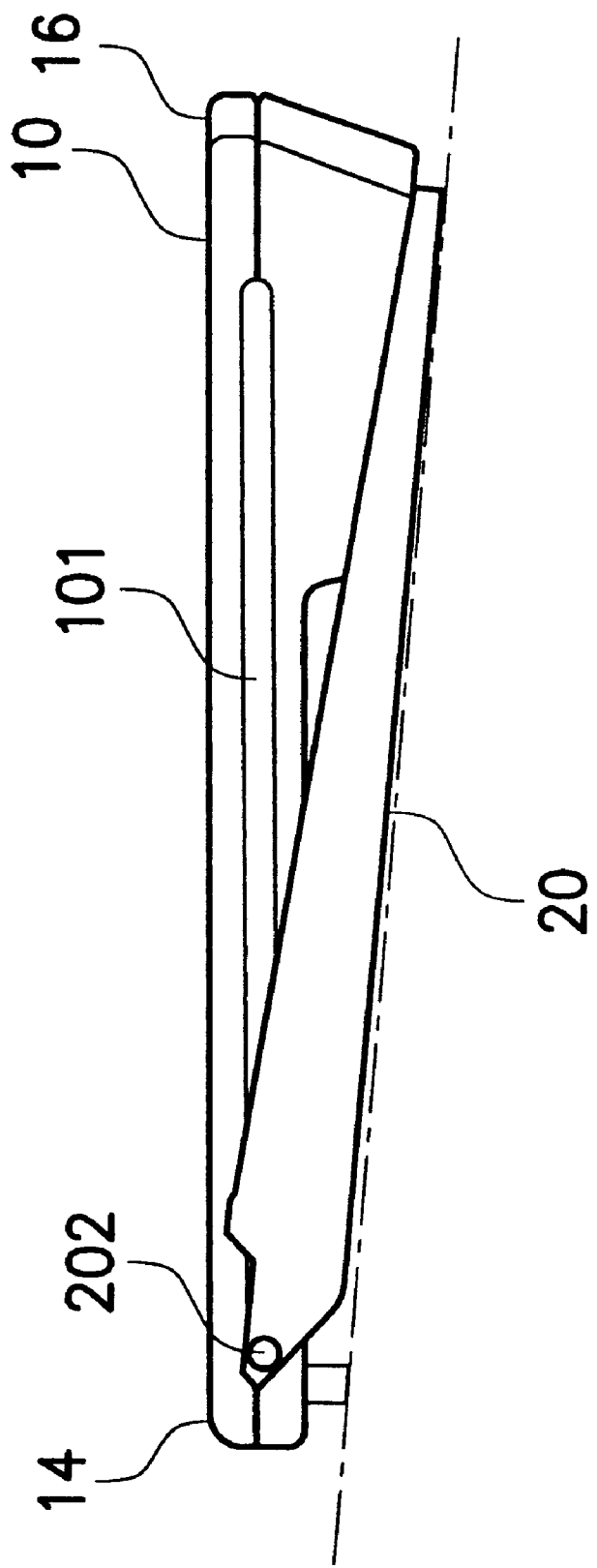
FIG. 4 shows the cover of the keyboard in a stowing operation in accordance with the first embodiment of the present invention.

If the user does not need to read documents during typing, then he pulls the cover 20 in a direction "B" in FIG. 2 and rotates the cover 20 to the bottom of the keyboard body 10 in a direction "C" in FIG. 3. The result is shown in FIG. 4, wherein the pivot 202 is at a third position near the front edge 14 of the keyboard body 10. The cover 20 is stowed under the keyboard body 10 and therefore occupies only a very small amount of extra space.

Newspapers and magazines report on "tendinitis" from time to time. A user's tendons easily get inflamed if he always types without a wrist support. The present invention also provides a solution of this problem. Referring back to FIG. 3, the cover 20 and the keyboard body 10 are disposed on a desk surface indicated by a broken line. The pivot 202 is pushed into the operating zone 101' of the groove 101 so that the top surfaces of the keyboard body 10 and cover 20 are flat. The cover 20 at this time functions as a wrist rest to protect the user from tendinitis.

Figure 5:
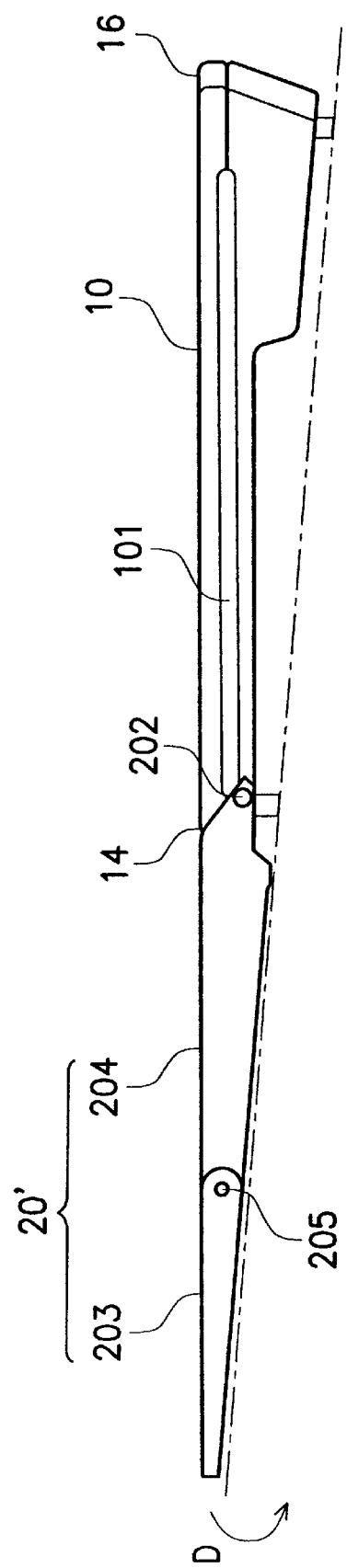
FIG. 5 is a plan view of a keyboard in accordance with a second embodiment of the present invention.
Figure 6:
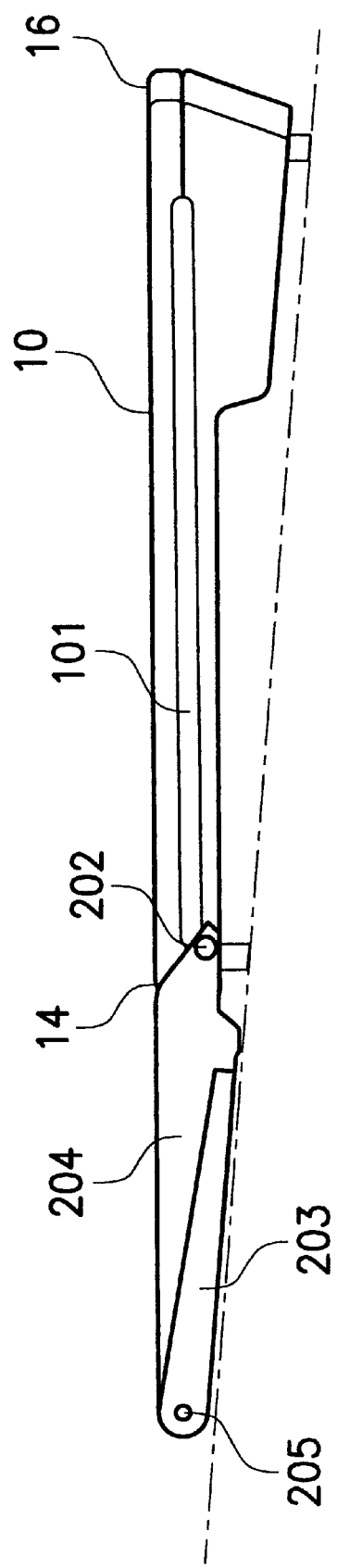
FIG. 6 shows a first cover board and a second cover board of a cover of the keyboard folded together in accordance with the second embodiment of the present invention.

FIG. 5 shows a keyboard of a second embodiment of the present invention, in which elements that are same as those in the first embodiment are indicated by the same reference numbers and the descriptions thereof omitted. In the second embodiment, the cover 20' includes a first cover board 203 and a second cover board 204. The two cover boards 203, 204 are connected together via a hinge 205 so that the first cover board 203 can rotate with respect to the second cover board 204 in a direction "D" in FIG. 5. The result is shown in FIG. 6, in which the first cover board 203 is stowed under the second cover board 204 to reduce the occupied space while functioning as a wrist rest. It is understood that the cover 20' of the keyboard in the second embodiment can also be used to support documents and offer dust protection, as disclosed in the first embodiment.

Figure 7:
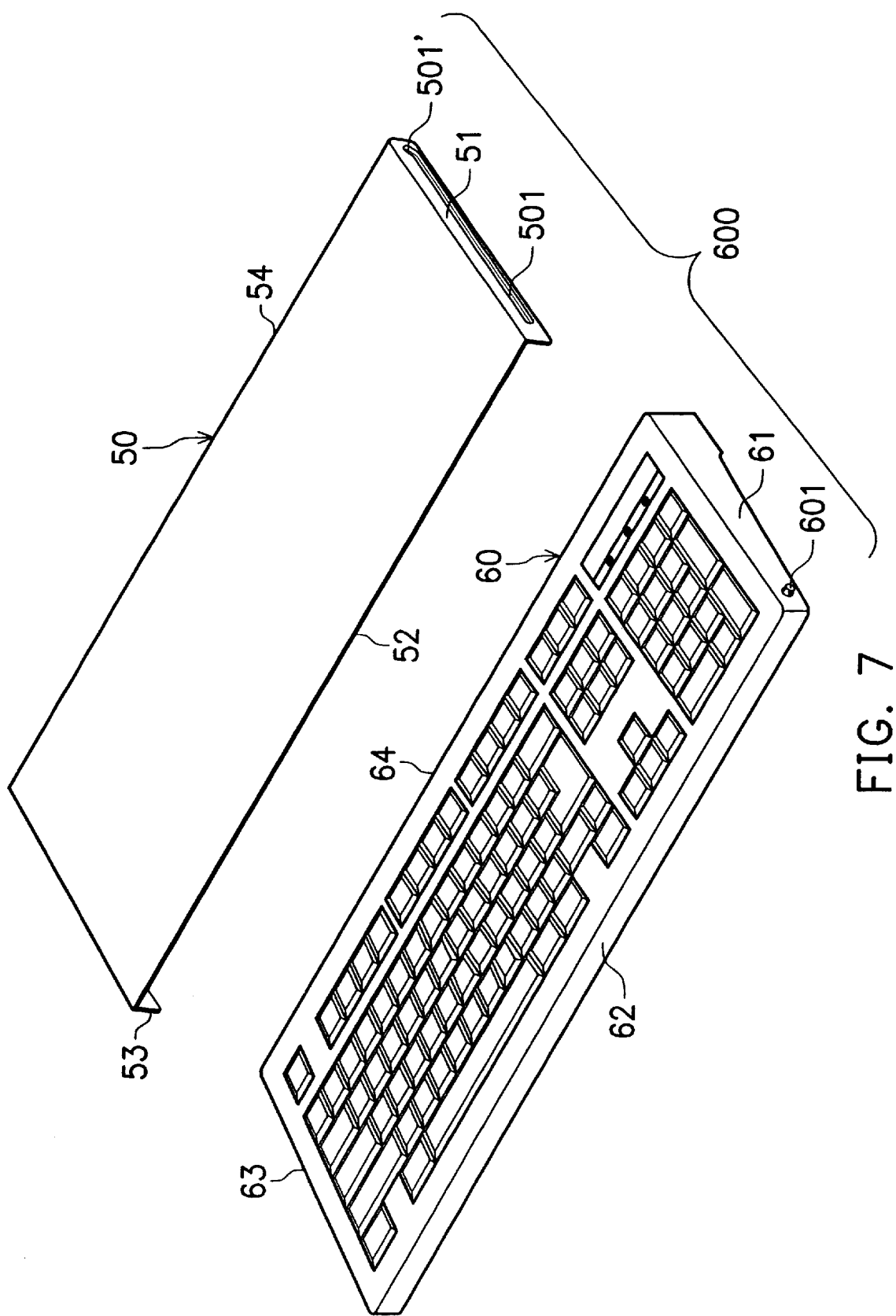
FIG. 7 is an exploded perspective diagram of a keyboard in accordance with a third embodiment of the present invention.
Figure 8:
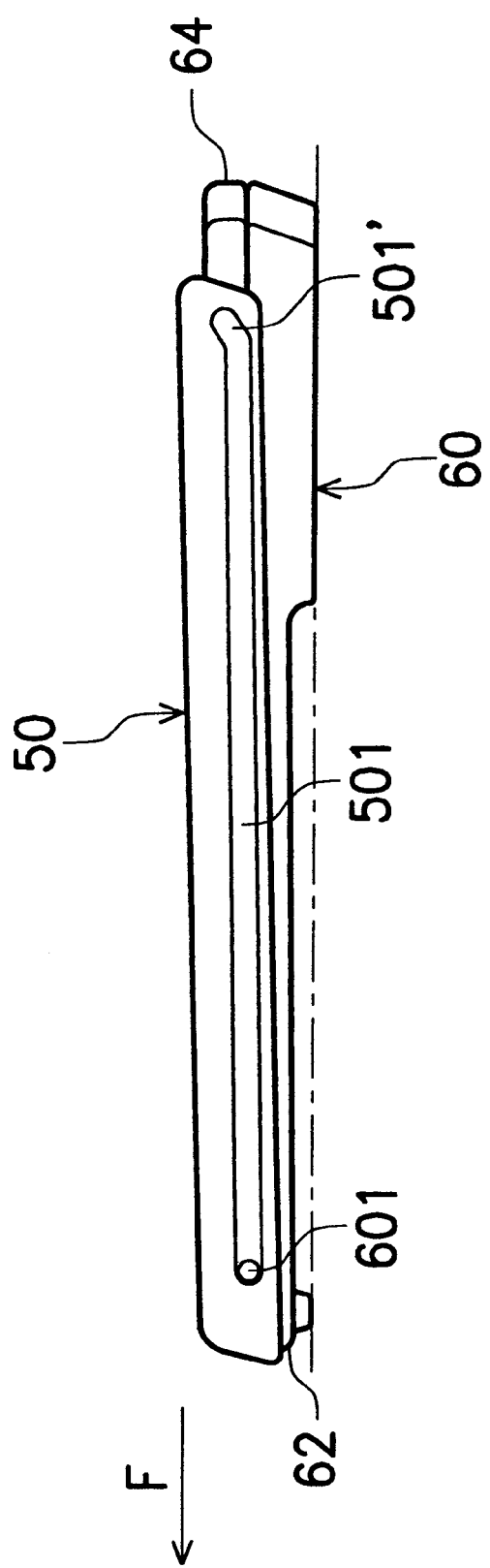
FIG. 8 shows a cover of the keyboard in a dust-protection operation in accordance with the third embodiment of the present invention.

Referring to FIGS. 7 and 8, a keyboard 600 of a third embodiment of the present invention includes a keyboard body 60 and a cover 50. The keyboard body 60 is substantially rectangular and therefore has a first edge 61, a second edge 62, a third edge 63 and a fourth edge 64. The first edge 61 is opposite to the third edge 63, while the second edge 62 is opposite to the fourth edge 64. Furthermore, two pivots 601 are respectively provided on the first and third edges 61, 63. The cover 50 is also substantially rectangular and has a first edge 51, a second edge 52, a third edge 53 and a fourth edge 54. The first edge 51 is opposite to the third edge 53, while the second edge 52 is opposite to the fourth edge 54. Furthermore, two slots 501 are respectively provided on the first and third edges 51, 53 of the cover 50 for receiving the pivots 601 of the keyboard body 60. Each slot 501 extends in a direction from the second edge 52 to the fourth edge 54 of the cover 50. Furthermore, the extending direction of the slot 501 is changed near the fourth edge 54 where an operating zone 501' is formed at the end of the slot 501.

When the keyboard is not in use, the user moves the cover 50 to a position shown in FIG. 8 to protect the keyboard body 60 from water, dust and small objects.

Figure 9:
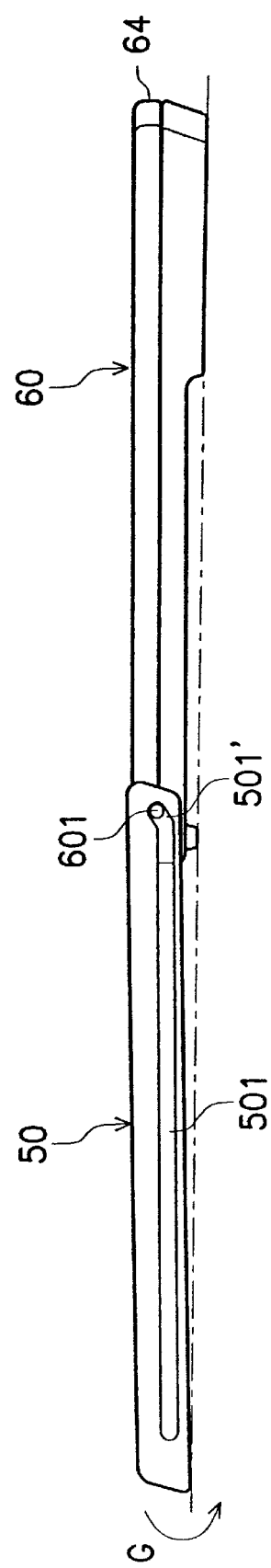
FIG. 9 shows the cover of the keyboard in a wrist-rest operation of the cover in accordance with the third embodiment of the present invention.

When the user needs a wrist support, he pulls out the cover 50 in direction F shown in FIG. 8 to a position shown in FIG. 9, wherein the pivots 601 of the keyboard body 60 are pushed into the operating zones 501' of the cover 50 so that the top surfaces of the keyboard body 60 and the cover 50 are flat. The cover 50 at this time functions as a wrist rest to protect the user from tendinitis.

Figure 10:
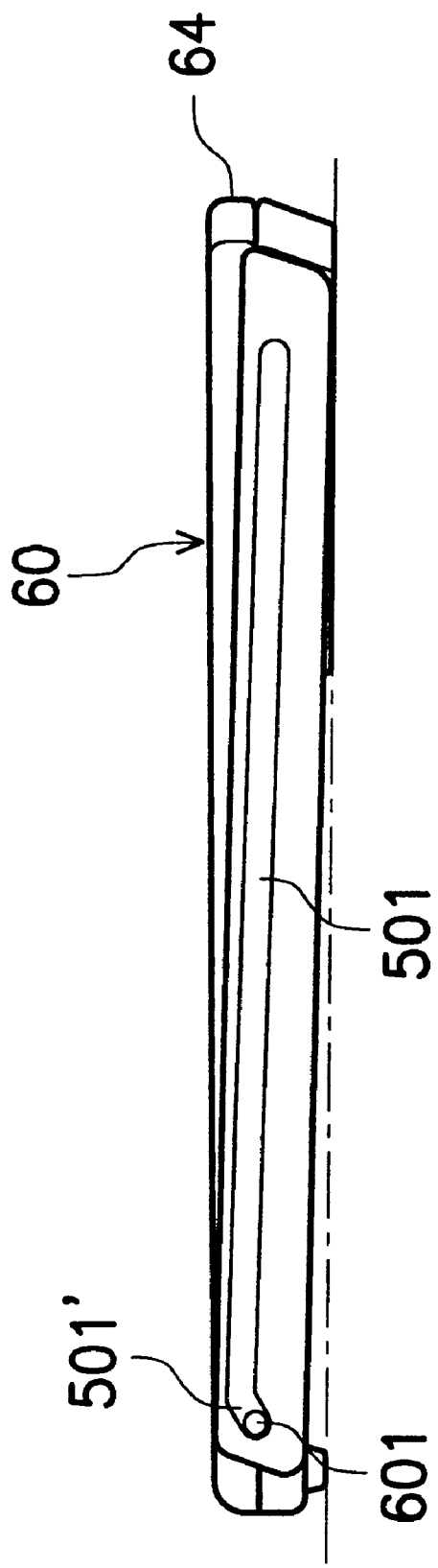
FIG. 10 shows the cover of the keyboard in a stowing operation in accordance with the third embodiment of the present invention.

If the user does not need a wrist rest, then he rotates the cover 50 in direction G (FIG. 9) to the bottom of the keyboard body 60. As shown in FIG. 10, the cover occupies only a very small amount of extra space.

In the present invention, the cover is movably pivoted onto the keyboard body. By this arrangement, the cover occupies only a very small amount of extra space, which is an asset of the present invention.

In addition to dust protection and wrist resting provided by the prior art, the present invention provides the function of document support. The user can type on the keyboard of the present invention while reading. That is another asset of the keyboard of the present invention.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A keyboard comprising:
   a keyboard body on which grooves are provided; and
   a cover having pivots movably mounted in the grooves so that the cover is rotatable and movable with respect to the keyboard body.

2. A keyboard as claimed in claim 1, wherein the cover further has a first cover board and a second cover board hinged together.

3. A keyboard as claimed in claim 1, wherein the keyboard body is substantially rectangular and therefore has a first edge, a second edge, a third edge and a fourth edge; the first edge is opposite to the third edge while the second edge is opposite to the fourth edge; the grooves are provided on the first and third edges; and the grooves extend in a direction from the second edge to the fourth edge.

4. A keyboard as claimed in claim 3, wherein the direction in which the grooves extend is changed near the fourth edge.

5. A keyboard comprising:
   a cover on which slots are provided; and
   a keyboard body having pivots movably mounted in the slots so that the cover is rotatable and movable with respect to the keyboard body.

6. A keyboard as claimed in claim 5, wherein the cover is substantially rectangular and therefore has a first edge, a second edge, a third edge and a fourth edge; the first edge is opposite to the third edge while the second edge is opposite to the fourth edge; the slots are provided on the first and third edges; and the slots extend in a direction from the second edge to the fourth edge.

7. A keyboard as claimed in claim 6, wherein the direction in which the slots extend is changed near the fourth edge.

8. The keyboard as claimed in claim 6, wherein each groove extends from a first end near the fourth edge and a second end near the second edge, the pivots being movable between the first end and the second end.

9. The keyboard as claimed in claim 8, wherein, when the pivots are moved to the second end, the cover is rotatable to a closed position in which the cover covers the keyboard.

10. The keyboard as claimed in claim 8, wherein, when the pivots are moved to the first end, the cover is rotatable between a second position in which the cover extends away from the front edge of the keyboard such that the top surfaces of the keyboard and the cover are substantially coplanar and a third position in which the cover is stowed under the keyboard body.

11. The keyboard as claimed in claim 8, wherein, when the pivots are moved to the second end, the cover is rotatable to a closed position in which the cover covers the keyboard, and when the pivots are moved to the first end, the cover is rotatable between a second position in which the cover extends away from the front edge of the keyboard such that the top surfaces of the keyboard and the cover are substantially coplanar and a third position in which the cover is stowed under the keyboard body.

12. A keyboard comprising:
   a keyboard body having a front edge and a rear edge and opposite sides, a groove being provided on each side, each groove extending from a first end near the rear edge to a second end near the front edge; and
   a cover having pivots movably mounted in the grooves so that the cover is rotatable with respect to the keyboard body, the pivots being movable between the first end and the second end.

13. The keyboard as claimed in claim 12, wherein, when the pivots are moved to the first end, the cover is rotatable between a closed position in which the cover covers the keyboard and a second position in which the cover stands substantially upright.

14. The keyboard as claimed in claim 12, wherein, when the pivots are moved to the second end, the cover is rotatable between a second position in which the cover extends away from the front edge of the keyboard such that the top surfaces of the keyboard and the cover are substantially coplanar and a third position in which the cover is stowed under the keyboard body.

15. The keyboard as claimed in claim 12, wherein, when the pivots are moved to the first end, the cover is rotatable between a closed position in which the cover covers the keyboard and a second position in which the cover stands substantially upright, and when the pivots are moved to the second end, the cover is rotatable between a second position in which the cover extends away from the front edge of the keyboard such that the top surfaces of the keyboard and the cover are substantially coplanar and a third position in which the cover is stowed under the keyboard body.

16. The keyboard as claimed in claim 12, wherein the groove bends at the second end.

17. The keyboard as claimed in claim 1, wherein the groove has a length equal to at least a half of the length of the side.

18. The keyboard as claimed in claim 1, wherein the cover has a main portion and side walls which enclose the side of the keyboard and have the grooves covered.

* * * * *

UNITED STATES PATENT AND TRADEMARK OFFICE
CERTIFICATE OF CORRECTION

PATENT NO. : 6,489,949 B1
DATED : December 3, 2002
INVENTOR(S) : Chun-Shiung Yin It is certified that error appears in the above-identified patent and that said Letters Patent is hereby corrected as shown below:

<u>Title page,</u>
Item [73], Assignee, should read as follows:

-- [73] Assignee: Darfon Electronics Corp., Taoyuan (TW) --

Signed and Sealed this

Third Day of June, 2003

JAMES E. ROGAN
*Director of the United States Patent and Trademark Office*